April 14, 1959  L. R. MOSKOWITZ ET AL  2,882,487
MAGNETIC INSTRUMENT
Filed Sept. 24, 1954

Inventor
LESTER R. MOSKOWITZ
CLAYTON H. ALVORD
By Charles L. Lovercheck
Attorney United States Patent Office 2,882,487
Patented Apr. 14, 1959

2,882,487

MAGNETIC INSTRUMENT

Lester R. Moskowitz and Clayton H. Alvord, Erie, Pa., assignors to Eriez Manufacturing Co., Erie, Pa., a corporation of Pennsylvania Application September 24, 1954, Serial No. 458,168

9 Claims. (Cl. 324—34)

This invention relates to measuring instruments and more particularly to instruments for measuring the permeance of a magnetic material being the class of instruments sometimes known as magnetic permeameters.

Instruments for measuring the permeance of a magnetic circuit which are made according to previous designs use principles which render the design thereof complex and the principles on which these instruments operate are not adapted to give the results desired.

Various designs of instruments such as contemplated herein have been provided. Many of them utilized electrical circuits which were costly to construct and unreliable in operation. The present invention proposes an instrument using a permanent magnet as its prime element. The operation of this instrument is based on the principle that when two magnetic materials are placed within the same portion of the same magnetic field, magnetic poles will be created in the two magnetic materials by induction and the poles so induced will be like poles; that is, the two induced magnets will be disposed in parallel with each other. It is elementary in the field of permanent magnets that magnetic materials repel each other where like induced poles therein are disposed adjacent to each other. This repulsive force will vary in degree with the distance between the like poles of the two magnets and will vary in accordance with the strength of the magnet.

Since various kinds of steel such as cold rolled steel, hot rolled steel, and stainless steel have different magnetic properties, it is possible with this device to distinguish between different types of steel in order to determine what kind of steel a particular sample is. Further, since the permeance of a magnetic circuit varies with the air gap, it is possible to determine the thickness of a paint film on a body or the degree of heat penetration of a specimen of steel by properly calibrating the scale on the instrument disclosed herein and properly disposing the specimen alongside the instrument.

It is, accordingly, an object of this invention to overcome the above and other defects and disadvantages in prior instruments and, more particularly, it is an object of this invention to provide an instrument for determining the variation of temperature, composition, surface coating, or relative proximity of magnetic materials.

Another object of this invention is to provide an instrument for measuring the permeance of a magnetic circuit wherein a magnet induces a magnetic field in a piece of magnetizable material, the magnetizable material being pivotally mounted on the instrument and adapted to be disposed in proximity to a test specimen to be measured.

A further object of this invention is to provide an instrument for measuring the permeance of a magnetic circuit which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
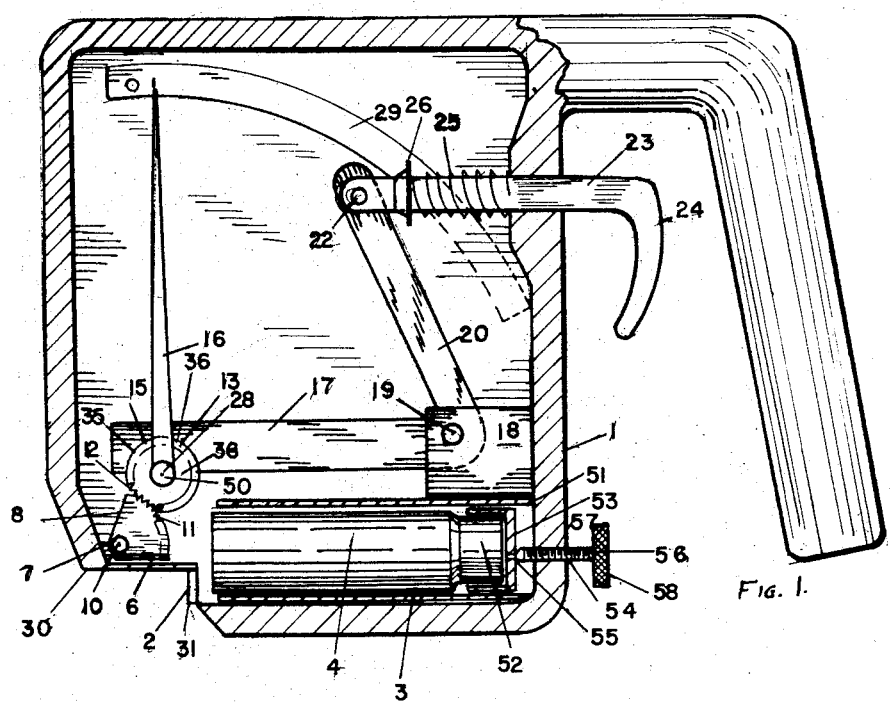
Fig. 1 is a transverse cross sectional view of the instrument.

Now with more specific reference to the drawing, one embodiment of the novel instrument is made up of a frame or case 1 made of non-magnetic material. The case 1 may be of any desired shape and is preferably provided with a notch 2 at a convenient location thereon. Inside the case 1 adjacent the notch 2 is supported a permanent magnet 4. The permanent magnet 4 is preferably a strong permanent magnet material such as an aluminum-cobalt-nickel alloy, a material known under the trademark "Alnico V." The magnet 4 is disposed with its longitudinal axis extending from the notch 2 as shown and the north and south poles labeled N and S in the drawing will be disposed as shown. The moving parts of the indicating assembly are made up of the iron armature 6 extending generally radially from the shaft 7 and the gear segment 8 which is fixed to the shaft 7 to rotate therewith and has the iron armature 6 attached thereto. The shaft 7 is pivoted between needle bearings 10. The teeth 11 on the gear segment 8 engage the teeth 12 on the gear 13. The gear 13 is fixedly mounted on the shaft 28 and, likewise, the pointer 16 is fixed to rotate with the shaft 28 and the gear 13. All of the parts, including the shaft 7, the gear segment 8, the gear 13, and the pointer 16 on the shaft 28, are made of non-magnetizable material.

A brake drum 36 is attached to brake arm 17 and adapted to lockingly engage a brake shoe 35 which is attached to the gear 13. The brake arm 17 is pivotally mounted on the bracket 18 on the frame 1 by means of the pivot 19. The brake arm 17 is in the form of a bell crank having the arm 20 extending upwardly therefrom and pivotally attached at 22 to the body 23 of a trigger mechanism 24. The brake shoe 35 is attached to the arm 17 and swings therewith. A helical spring 25 is concentrically disposed on the body 23 of the trigger mechanism 24 and engages a collar 26 which is fixed to the body 23 of the trigger 24. The shaft 28 is likewise pivoted to the frame 1 by means of the needle bearings 50. To summarize, it will be noted that all of the parts of the instrument are of non-magnetic material with the exception of the permanent magnet 4 and the armature 6.

The function of the trigger 24 is to apply the brake shoe 35 to the brake drum 36. During the measuring operation, the trigger 24 is depressed and, therefore, the arm 17 pulls the shoe 35 out of engagement with the brake drum 36. The trigger 24 can then be released when the pointer 16 has moved to the indicating point and the brake shoe 35 will hold the pointer 16 in this position while a reading is being taken. This facilitates the use of the device in measuring the temperature of hot bodies because the instrument is not required to be held in contact with the hot body while a reading is being taken.

A scale 29 is fixedly supported in the frame 1 and may be calibrated in a manner suitable for the individual application. For example, it may be calibrated to indicate the temperature of a particular analysis of iron or it may be calibrated to indicate the thickness of coating on a particular kind of iron. The strength of the magnetic field is fixed by the energy output of the magnet 4. The permanent magnet 4 is centrifugally mounted in the non-magnetic tube 51 and has one end 52 of reduced size diameter. A non-magnetic tube 53 is placed over the reduced size end 52 and has a screw 54 pivotally attached thereto at 55. The screw 54 is threaded at 56 to engage threads at 57 on the casing 1 and has a knurled head 58 for convenience in rotating.

When it is desired to increase the strength of the magnetic field in the notch 2, the magnet 4 may be moved toward the notch 2 by rotating the knurled handle 58 to move the magnet 4 in the tube 51 toward the notch 2.

Figure 2:
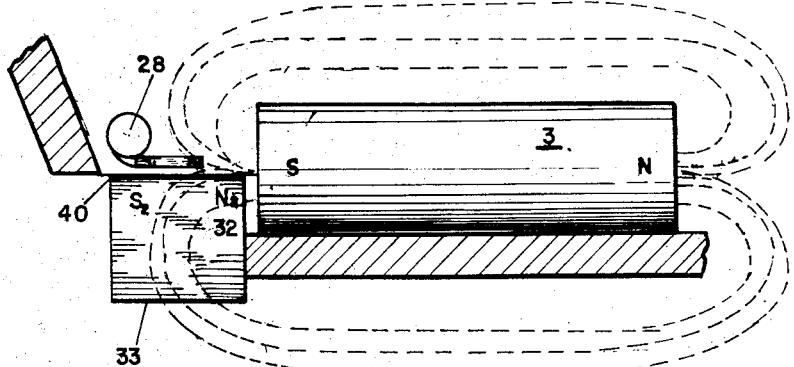
Fig. 2 is a view of the magnetic circuit of the instrument and a test specimen disposed adjacent thereto.

In operation, the sample 33 to be tested is firmly disposed in the notch 2 with one edge thereof against the surface 30 and the other edge thereof in engagement with the edge 31 of the notch 2. Since the armature 6 is fixed at one end thereof to rotate with the shaft 7, any force on the end of the armature 6 opposite the shaft 7 will tend to rotate the armature 6 about the shaft 7. If the permanent magnet 4 is disposed in an instrument as shown in Fig. 2 with the north and south poles as shown, the north and south poles $N_1$ and $S_1$ will be induced in the armature 6. Likewise, similar poles $N_2$ and $S_2$ will be induced at the upper surface 32 of the sample 33. Since it is elementary that like poles repel, the pole $N_1$ will be repelled by the pole $N_2$, and therefore, the armature 6 will exert a torque on the shaft 28. When the sample 33 is removed, the field on the magnet 4 will attract the armature 6 and cause it to tend to align itself with the magnet 4 and, therefore, rotate the pointer 16 back to the zero position shown.

In operation, a bar of magnetizable material is placed in the notch 2 and the trigger 24 is depressed to lift the brake shoe 35 out of engagement with the brake drum 36. The magnetic field 37 produced by the magnet 4 will induce magnetism of the polarity shown in the sample 33 on the armature 6 and the pole $N_2$ will repel the pole $N_1$. Therefore, since the armature 6 is attached to the gear 13, it will rotate the gear 13 and the pointer 16 therewith, the repelling force being between the pole $N_2$ and the pole $N_1$. If the polarity of the magnet 4 were reversed, the polarity of the induced poles $S_1$ and $S_2$ and $N_1$ and $N_2$ would likewise be reversed. When the sample 33 is removed, the pole $N_2$ will be attracted by the pole $S_1$ and, therefore, the gear segment 8 will be rotated in a clockwise direction, rotating the gear 13 in a counter-clockwise direction to bring the pointer 16 to the zero position. The sample 33 is heated to the "Curie point." The sample 33 will become non-magnetic and since there will be no pole $N_2$ to repel the pole $N_1$, the pointer 16 will be pulled to the zero position, indicating that the sample 33 has reached the "Curie point" temperature.

Since the distance between the poles $N_2$ and $N_1$ will determine the repelling force thereof for a given material, if a coating 40 is put on the surface between the sample 33 and the armature 6, the sample 33 will be held at a greater distance from the armature 6. Therefore, the force between the poles $N_2$ and $N_1$ will be reduced and the pointer 16 will not be moved as far from the end position. The scale 29 can be calibrated to indicate the distance between the poles $N_2$ and $N_1$ or, in other words, the thickness of the coating 40. The scale 29 could be calibrated in terms of depth of surface of metal heated to the "Curie point," the thickness of coating on the sample, the material of the sample, or the scale could be calibrated in terms to make many other factors and calibrations which would be determined by the variation of the repelling force between the poles $N_1$ and $N_2$, depending upon the particular material being tested, the thermal and magnetic characteristics of the material, and the spacing of the material from the edges 30 and 31 of the notch 2.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An indicating device for indicating the permeance of a magnetic circuit comprising a non-magnetic support, a reference surface on said support, a permanent magnet disposed adjacent said reference surface, a magnetizable armature disposed generally parallel to said reference surface and pivotally mounted adjacent said reference surface with its longitudinal axis adapted to be disposed in alignment with the longitudinal axis of said permanent magnet, said permanent magnet having a field intersecting said armature and an indicating needle operatively connected to said armature whereby a magnetizable specimen disposed against said reference surface has magnetic poles induced therein adjacent magnetic poles induced in said magnetizable armature whereby the poles in said specimen repel the induced poles in said armature, swinging said armature about said point and operating said indicating needle to indicate the degree of repulsive force.

2. The indicating device recited in claim 1 wherein said armature has a gear segment attached thereto operatively engaging a gear attached to said indicating needle whereby said needle is rotated in a direction opposite to the rotation of said gear segment.

3. The indicating device recited in claim 1 wherein a releasable brake is provided to engage said needle releasable to allow said needle to move to an indicating position and to hold said needle in said indicating position.

4. An indicating instrument comprising a case of non-magnetizable material, an armature swingably mounted in said case, a permanent bar magnet attached to said case with its field intersecting said armature disposed adjacent said armature, a reference surface, said surface being disposed adjacent one end of said permanent magnet and generally parallel thereto and the other edge disposed adjacent said armature whereby a specimen to be tested may be disposed against said surface with one end of said specimen adjacent the end of said permanent magnet and said specimen being disposed in general alignment with said armature whereby magnetic fields are induced in said specimen and said armature, the like pole of said specimen field disposed adjacent the like pole of said armature whereby said like poles repel each other, rotating an indicating member operatively connected to said armature whereby the strength of the field in said specimen is indicated.

5. The indicating instrument recited in claim 4 wherein an arm member is pivotally connected to said case, said arm member having means thereon operatively engageable with a means on said indicating member whereby said brake may be released to allow said indicating member to move to an indicating position and said indicating member may be locked in said indicating position.

6. An indicating instrument comprising a frame of non-magnetizable material, a permanent bar magnet having a longitudinal axis supported in said frame, a reference surface on said frame, said reference surface being generally parallel with the longitudinal axis of said magnet, a magnetic armature having a longitudinal axis and having its said longitudinal axis disposed generally parallel to said reference surface, said armature being swingably mounted on said frame and adapted to have magnetism induced therein by flux from said permanent magnet, said reference surface adapted to have an article made of magnetic material disposed thereagainst whereby magnetism is induced in said article of polarity similar to that induced in said armature by said flux with induced poles of said armature being adjacent induced poles of said article whereby said poles repel each other and said armature is urged to swing away from said article, and indicating means attached to said armature.

7. The instrument recited in claim 6 wherein said indicating means is swingable on an axle, a brake drum is attached to said axle, and brake means for said brake drum is mounted on said frame and swingable away from said drum.

8. The instrument recited in claim 7 wherein said brake is supported on said frame by means of a bellcrank and handle means is attached to said bellcrank whereby said brake may be moved out of engagement with said brake drum.

9. The instrument recited in claim 7 wherein said magnet is slidably disposed in a non-magnetic tube and means is provided to slide said magnet in said tube toward and away from said armature and said reference surface.

References Cited in the file of this patent

UNITED STATES PATENTS

| | | |
|---|---|---|
| 2,384,529 | Breitenstein | Sept. 11, 1945 |
| 2,621,234 | Buehl | Dec. 9, 1952 |
| 2,651,846 | Rudge | Sept. 15, 1953 |